United States Patent [19]
Huang Lin

[11] Patent Number: 6,106,117
[45] Date of Patent: Aug. 22, 2000

[54] ASSEMBLED STRUCTURE OF A NOSE MAT MATCHED TO A NOSE SUPPORTER

[75] Inventor: Tsai Song Huang Lin, Taipei, Taiwan

[73] Assignee: Gazelle Corporation, Taipei, Taiwan

[21] Appl. No.: 09/370,872

[22] Filed: Aug. 10, 1999

[51] Int. Cl.$^7$ ....................................................... G02C 5/12
[52] U.S. Cl. ........................................... 351/136; 351/137
[58] Field of Search .................................... 351/136, 137, 351/138, 78

[56] References Cited

U.S. PATENT DOCUMENTS

| | | | |
|---|---|---|---|
| 5,572,265 | 11/1996 | Hasegawa | 351/137 |
| 5,828,438 | 10/1998 | Kou-Tseng | 351/137 |

*Primary Examiner*—Huy Mai
*Attorney, Agent, or Firm*—Rosenberg, Klein & Lee

[57] ABSTRACT

An assembled structure of a nose mat matched to a nose supporter is disclosed. The structure includes a nose mat and a nose supporter which have an inverse V shape and can be used to match the concave portion of the nose bridge portion of a glasses. Adjustable legs which may be bent freely are installed between the nose mat and the nose supporter. Therefore, as a user wears glasses with the nose mat, by the flexibility of the nose mat, the user may precisely adjust the nose mat according to the size of the nose to obtain a proper width and orientation. The nose mat can be adjusted as desired. Moreover, the upper rim of the bracket is installed with an embedded groove. Thus, after assembly, the combination structure of the nose mat and the nose supporter can be pushed into the concave portion of the nose bridge of the glasses and is detachable assembled therewithin. Not only the manufacturing cost is reduced, and the consumer has more option for choosing glasses.

13 Claims, 8 Drawing Sheets

ASSEMBLED STRUCTURE OF A NOSE MAT MATCHED TO A NOSE SUPPORTER

FIELD OF THE INVENTION

The present invention relates to an assembled structure of a nose mat matched to a nose supporter, and especially to a structure formed by a nose mat and a nose supporter which can be detachable assembled to various glasses, wherein the angle and width of nose mat can be adjusted according to the nose shape of the user. Thus, the user may wear pressure comfortably.

BACKGROUND OF THE INVENTION

In generally, in order that the user may wear glasses conveniently, each of the concave portion of the nose bridge is installed with a nose mat. The installation of the nose mat is according to the type of glasses. For example, the safety glasses used in driving a car or used in a water exercise have lens and frame made of plastic material. Thus, nose mat is necessary to be assembled additionally. Manufacturers focus to the assembled structure of the nose mat. One of the example is that a buckling block with groove is installed on a nose supporter for buckling with a nose mat with a respect groove. In another example, a hole for penetrating through the right and left sides of the nose mat is formed for passing through the frame to the center portion of the glasses. In a further example, an inverse V shape bracket is installed at the center of glasses frame, which can be inserted into the linkage holes at two sides of the nose mat. Some other similar structures have been disclosed in other Patent.

However, in this structure only the assembly way in production is emphasized, while the comfort of the consumers is not considered. The nose mat has a fix type. But different peoples have different sizes of noses, for example, the width of the nose, or the height of the nose bridge. Thus, it is possible that the glasses slide downwards or an optic shift is induced so as to harm the user's eyes so to effect the life of the user. Although part of the nose mat is made of elastic material for being bent or pulled for adjusting the elevation or width. However, the adjustment is obtuse and limited so not to match the shape of user's nose. The modifying shape can not be fixed. It is easily restored to the original shape due to pressing of nose bridge. Thus, the activity and fixing ability are necessary to be enhanced.

Moreover, the nose supporter for installed with a nose mat must be further installed with a specified means for being assembled to the frame of glasses or even it is directly formed on the frame in other words, the nose mat is only assembled by a nose supporter with a specified glasses, and can not be widely used in various glasses. However, the shapes and sizes of glasses made by different manufacturer or even same manufacturer are often different. Thus, these kinds of nose mats used in a specified nose supporter with specified glasses often become useless as the mold of glasses is changed due to updating of manufacturing process or equipment. Thus, the marker of the product is limited. Moreover, consumers having many glasses must buy a plurality of nose mats to match various glasses. Moreover, the consumers often lose the right to select desired glasses due to nose mats.

SUMMARY OF THE INVENTION

Accordingly, the primary object of the present invention is to provide an assembled structure of a nose mat matched to a nose supporter, wherein the angle and width of the nose mat can be adjusted easily at all aspect. Adjustable legs which may be bent freely are installed between the nose mat and the nose supporter. Therefore, as a user wears glasses with the nose mat, by the flexibility of the adjustable leg, the user may precisely adjust the nose mat according to the size of the nose to obtain a proper width and orientation. The nose mat can be adjusted as desired.

Another object of the present invention is to provide an assembled structure of a nose mat matched to a nose supporter which can be widely used in various glasses. By the embedding groove on the upper edge of the inverse V shape nose supporter, and the elasticity of the nose supporter, the combination structure of the nose mat and the nose supporter can be pushed into the concave portion of the nose bridge of the glasses and is detachable assembled therewithin. Not only the manufacturing cost is reduced, and the consumer has more right for choosing glasses.

The various objects and advantages of the present invention will be more readily understood from the following detailed description when read in conjunction with the appended drawing.

DETAILED DESCRIPTION OF THE PREFERRED EMBODIMENTS

Figure 1:
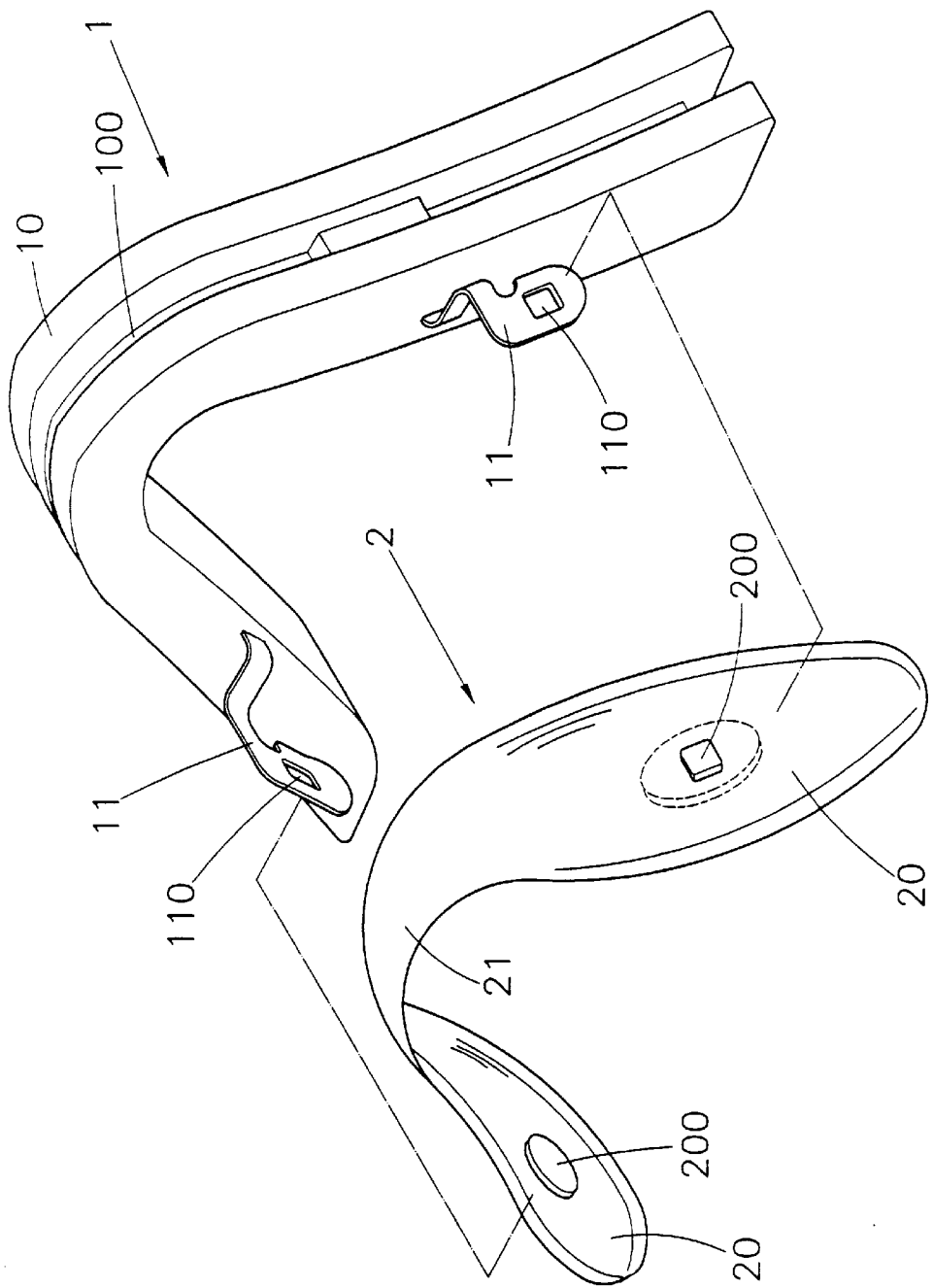
FIG. 1 is an exploded perspective view of the present invention.
Figure 2:
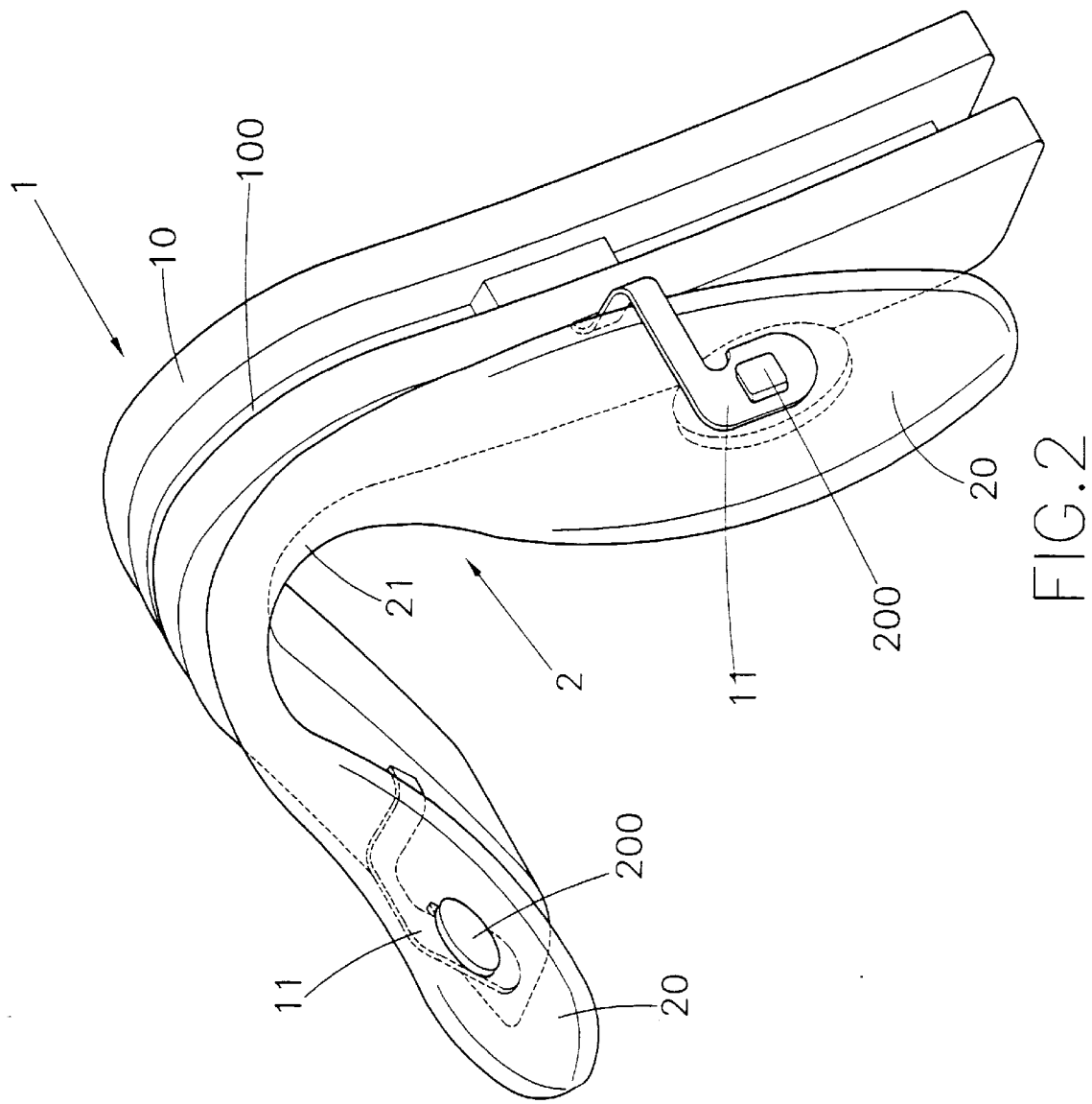
FIG. 2 is a perspective view showing the assembled structure of the present invention.
Figure 3:
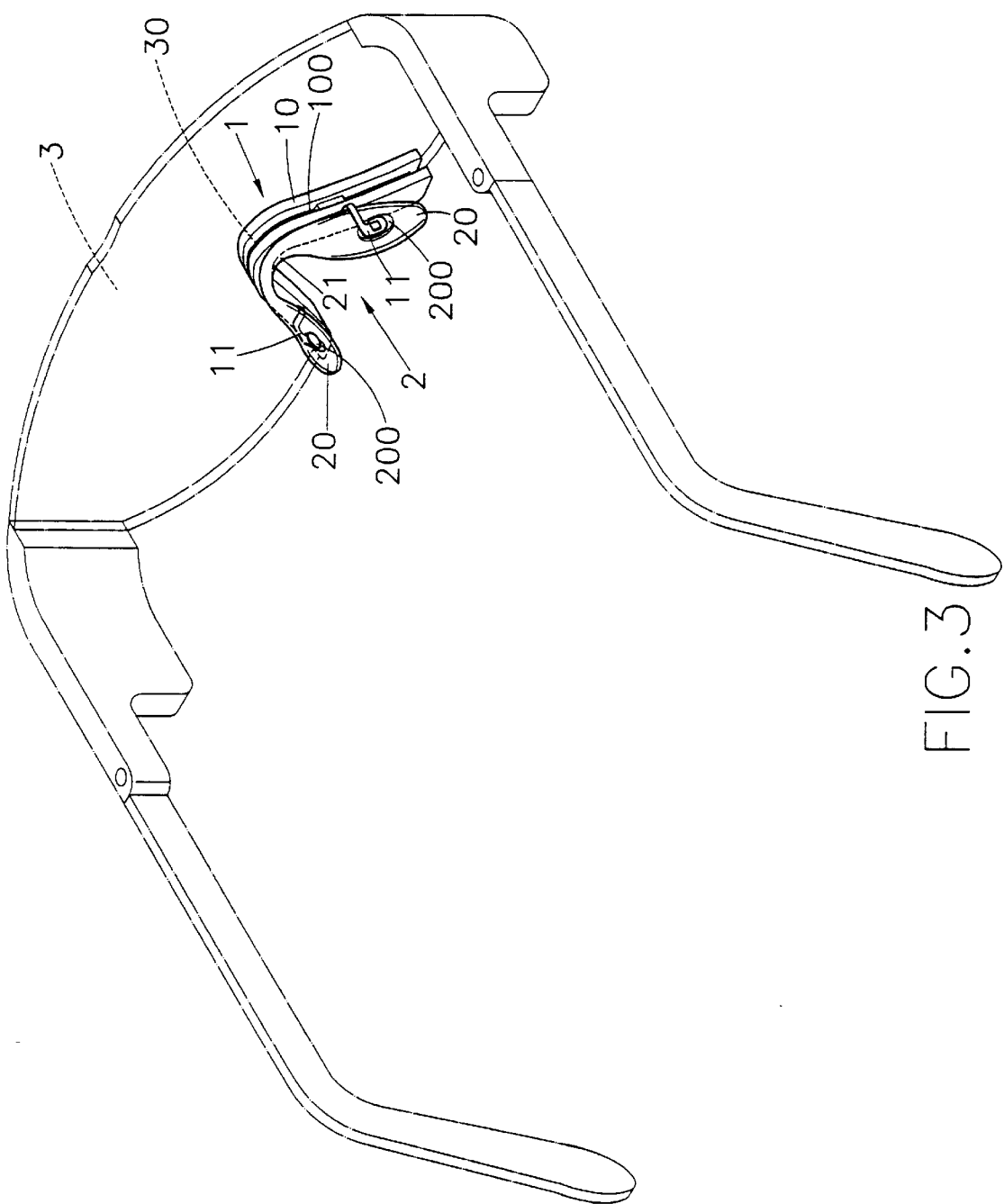
FIG. 3 is a schematic perspective view showing that the structure of the present invention is used in glasses.

With reference to FIGS. 1~3, a preferred embodiment of the an assembled structure of a nose mat matched to a nose supporter of the present invention is illustrated. The structure of the present invention includes a nose supporter 1 and a nose mat 2.

Figure 4:
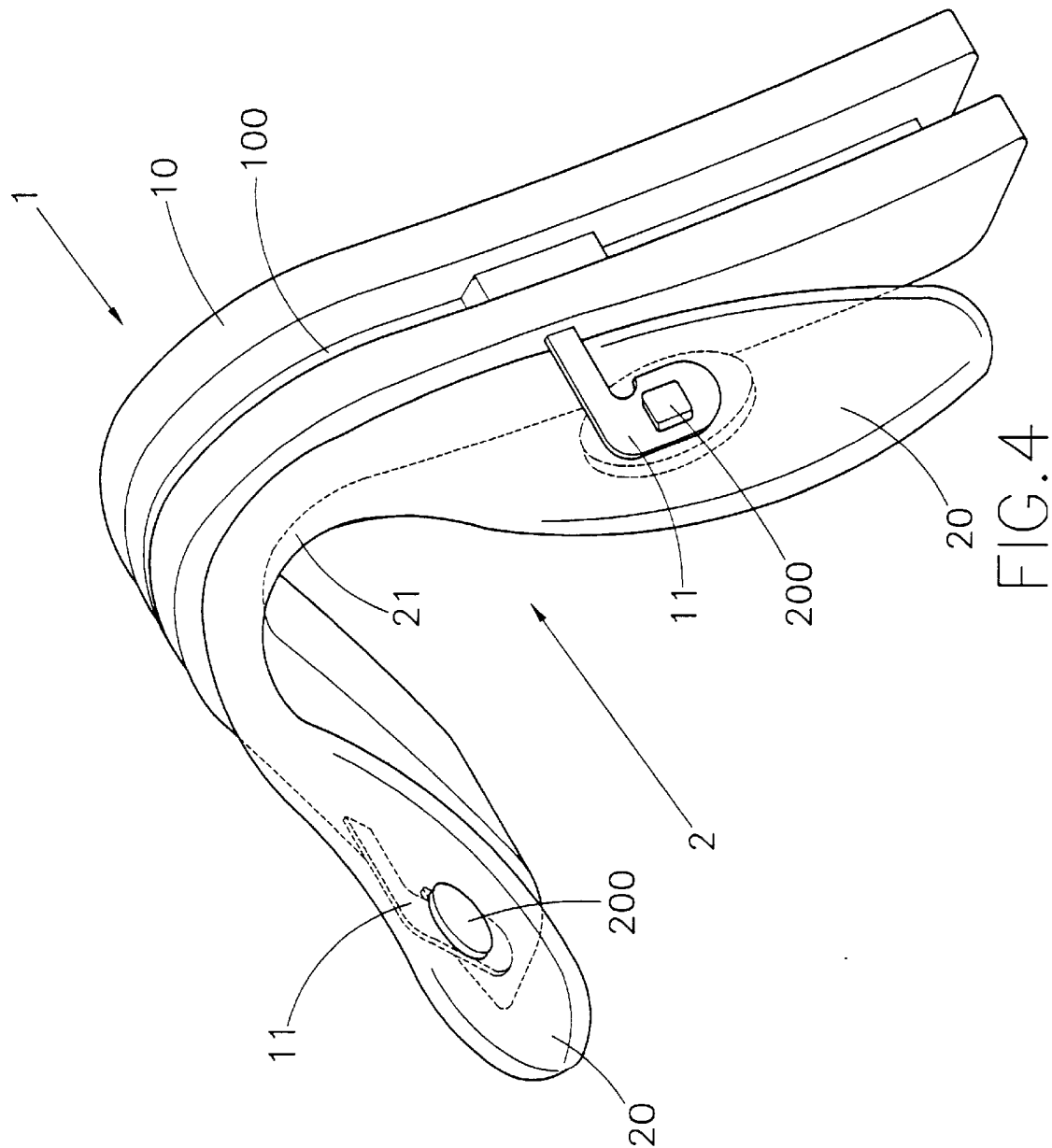
FIG. 4 is a perspective view showing the assembling structure of another embodiment of the present invention.

The nose supporter 1 has an inverse V shape and is a bracket 10 conforming any the concave potion 30 of the nose bridge in the center of a leisure or a working glasses 3. An embedding slot 100 is formed on the upper surface of the bracket 10. By the compressible elasticity of the plastic material and the V shape structure, the nose supporter can be clamped to the concave portion 30 of the nose bridge portion. Each of the two sides of the bracket 10 has a flexible adjustable leg 11 (for example, a metal adjustable leg) extended backwards so as to be connected to the nose mat 2. The adjustable leg 11 may be straight extended or an extended downward L shape parallel to the bracket 10 as the embodiment shown in FIGS. 1 to 3, or another embodiment shown in FIG. 4. In other words, the arrangement of the two adjustable legs with respect to the bracket 10 may have an outward extending flat shape, or an outward extending shape as the embodiment shown in FIGS. 1~3, or inversely, an inward extending shape so as to increase the active range for being flexibly adjusted. Besides, the distal end of each adjustable leg 11 is installed with a through hole 110.

The nose mat 2 has an inverse V shape as the embodiments shown in FIGS. 1~3 and FIG. 4. The nose mat 2 is made of soft material. Two sides thereof are a wider mat portion 20 while the center thereof is formed with a slender connected portion 21. The mat portion 20 may be installed with fixing blocks 200 as the mat portion is shaped or after the mat portion 20 has produced so that after the fixing blocks 200 has passed through the through hole 110 of the adjustable legs 11 to be connected to the adjustable legs 11 by rivets. Or, the mat portion 20 is inserted into the adjustable leg 11. Besides, the nose mat 2 can be designed as a first nose mat and a second nose mat which are separated. Similarly, the separated nose mats may be connected to the adjustable legs 11 through the fixing blocks 200 by rivets.

Figure 5:
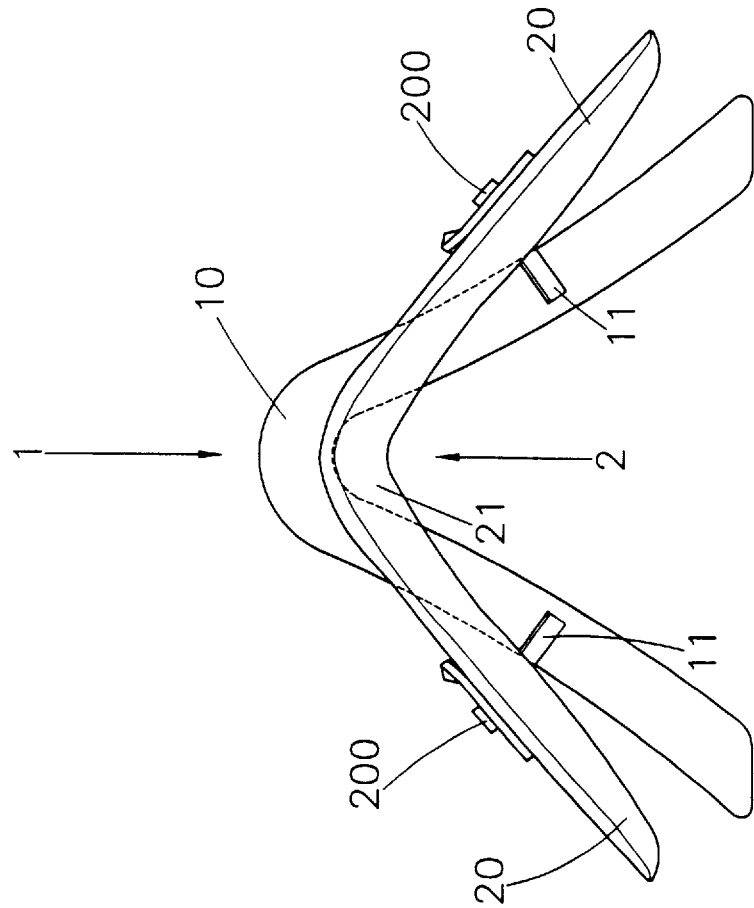
FIG. 5 is a rear view schematically showing that the present invention has been adjusted to an extended state.
Figure 6:
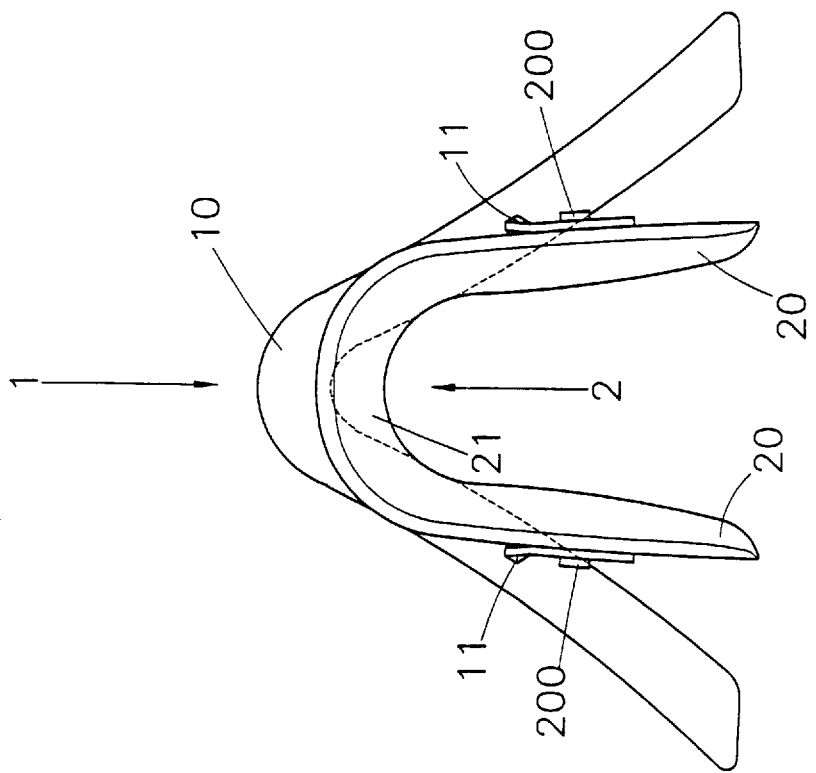
FIG. 6 is a rear view schematically showing that the present invention has been adjusted to a compressing state.
Figure 7:
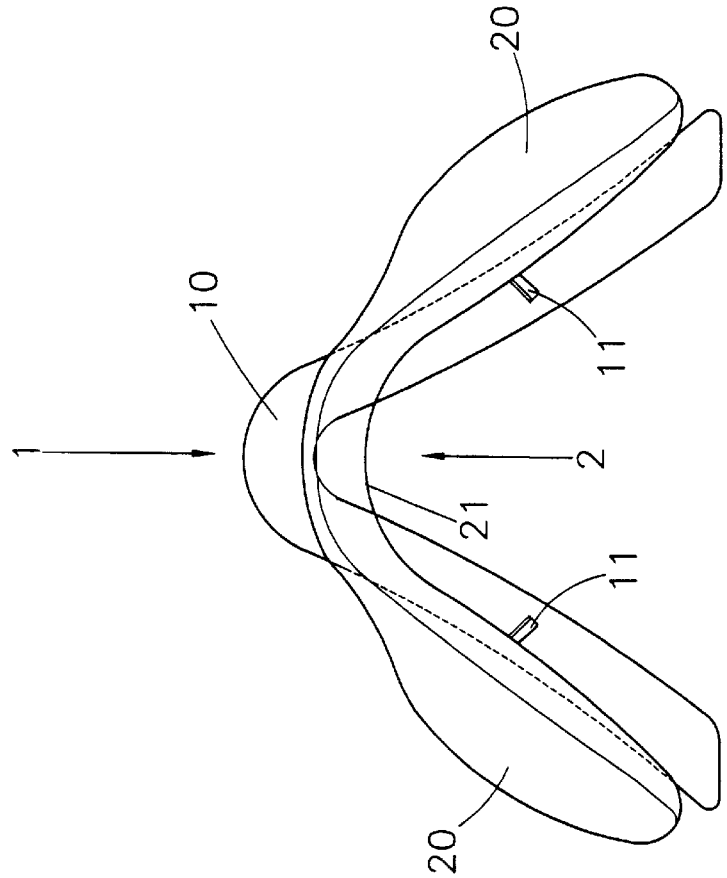
FIG. 7 is a rear view schematically showing that the present invention has been adjusted to be turned outwards.
Figure 8:
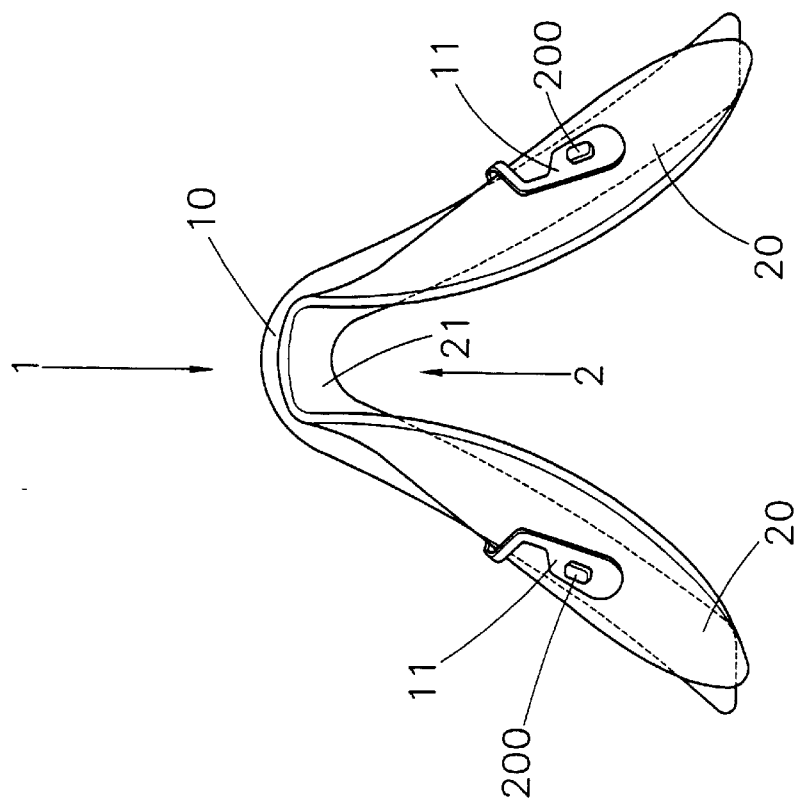
FIG. 8 is a rear view schematically showing that the present invention has been adjusted to a closing state.
Figure 9:
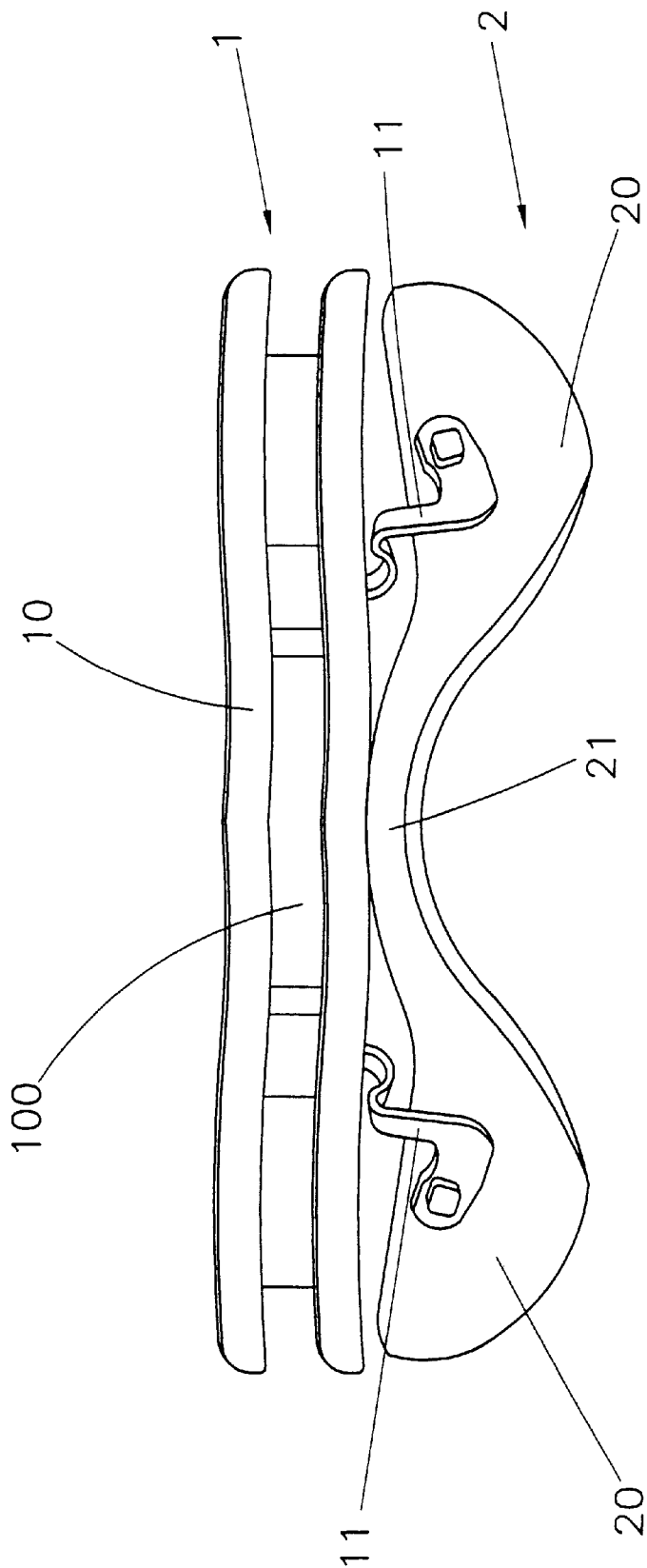
FIG. 9. is an upper view schematically showing that in the present invention, the nose mat is adjusted to be near the nose supporter.
Figure 10:
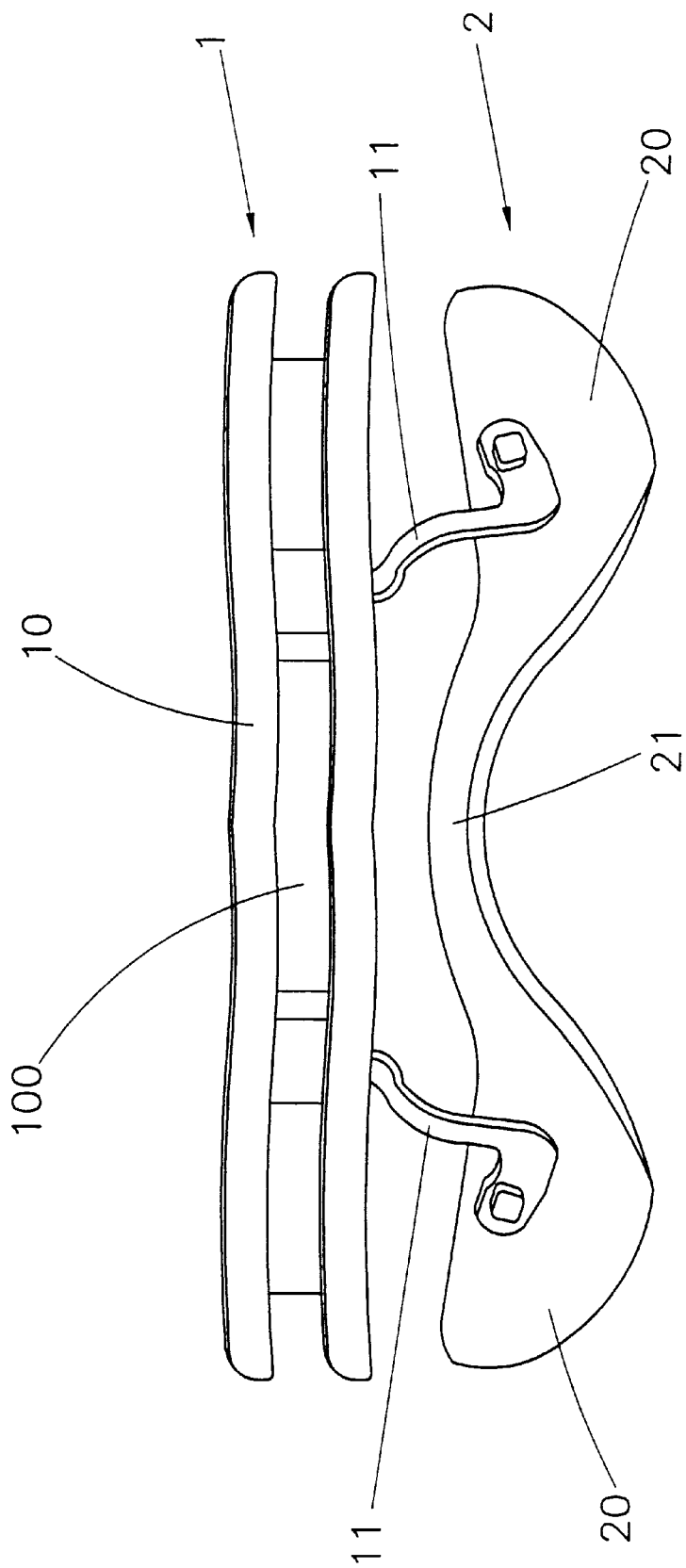
FIG. 10 is an upper view schematic showing that in the present invention, the nose mat is adjusted to be away from the nose supporter.

Therefore, the adjustable legs 11 for connection with the nose mat 2 can be bent flexibly in any orientation or aspect. Therefore, as a user wears glasses with the nose mat 2, by the flexibility of the nose mat 2, the user may precisely adjust the nose mat 2 according to the size of the nose to obtain a proper width and orientation. The nose mat can be adjusted as desired by appropriate adjustments of the adjustable legs 11, for example, outwards extending the nose mat 2 as shown in FIG. 5; inwards compressing the nose mat 2 as shown in FIG. 6; outwards turning the nose mat 2 as shown in FIG. 7; inwards turning the nose mat 2 as shown in FIG. 8; pressing the nose mat 2 towards the nose supporter 1 so as to reduce the elevation of the nose mat 2 as shown in FIG. 9; or pulling out the nose mat 2 so as to increase the elevation of the nose mat 2 as shown in FIG. 10. Moreover, the combination of some items of the aforementioned outwards extending, inwards compressing, outwards turning, inwards turning, pressing and pulling action may be selectably performed. Moreover, the nose mat 2 can be only bent or pulled to be flat. When the adjustable legs 11 have been adjusted, by the flexibility of the adjustable legs, they can be shaped steadily without resilience. Therefore, even due to the weight of the glasses 3 pressing on the nose bridge or due to vibration, the glasses 3 will not deform and retain in the original form. Thus, the defects that the sliding, tightness of glasses so that user's eyes feel uneasy are improved. Thus, the user may exercise or act happily.

Another, when the nose mat 2 and the nose supporter 1 are combined by the adjustable leg 11, they may be viewed as a single component for sale. The combination of the nose mat 2 and the nose supporter 1 can be widely used in most of leisure glasses 3 at past, now and furture. The user only needs push the nose supporter 1 into the concave portion 30 of the nose bridge, They can be combined rapidly. Namely, the extra nose mat 2 will not cause to modify the producing machine, mold of the glasses and the manufacturing process of the glasses. Moreover, the user is unnecessary to desert the current used glasses and buy another glasses for conforming the nose mat of the present invention. Further, if at further, a modified nose mat will be also suitable for glasses of old style.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An assembled structure of a nose mat matched to a nose supporter comprising:
    a nose supporter having a bracket with an inverse V shape and movably attached or detached to the concave portion of a nose bridge of a pair of glasses, and each of two sides of the bracket being installed with a respective adjustable leg which is extended backwards with a proper length and flexible bendable;
    a nose mat having an inverse V shape and made of soft material, two sides of the nose mat are connected to the adjustable legs of the nose supporter, respectively, thereby, as the nose mat being pushed, the adjustable legs being bent in all aspects so as to change the angle and width of the nose mat to fit the nose shape of a user.

2. The assembled structure of a nose mat matched to a nose supporter as claimed in claim 1, wherein an embedding slot is formed at the upper rim of the bracket of the nose mat for being embedded by the nose bridge portion of said pair of glasses.

3. The assembled structure of a nose mat matched to a nose supporter as claimed in claim 1, wherein the two sides of the nose mat have respective wider mat portion, while a thin and slender connection portion for connecting the two mat portions are formed at the center of the nose mat.

4. The assembled structure of a nose mat matched to a nose supporter as claimed in claim 1, wherein the nose mat is formed by a first nose mat and a second nose mat which are separated with one another, each nose mat is connected to the two adjustable legs at two sides of the nose supporter.

5. The assembled structure of a nose mat matched to a nose supporter as claimed in claim 1, wherein the distal end of each adjustable leg is bent as an L shape which is firstly extended parallel to the bracket and then extended rearwards.

6. The assembled structure of a nose mat matched to a nose supporter as claimed in claim 1, wherein adjustable leg has a straight flat shape which is extended backwards.

7. The assembled structure of a nose mat matched to a nose supporter as claimed in claim 1, wherein the two adjustable legs are shaped to be bent outwards with respect to the bracket.

8. The assembled structure of a nose mat matched to a nose supporter as claimed in claim 1, wherein the two adjustable legs are shaped to be bent inwards with respect to the bracket.

9. The assembled structure of a nose mat matched to a nose supporter as claimed in claim 1, wherein the distal end of the adjustable leg has a through hole, the nose mat is installed with a convex block in a position with respect to the adjustable leg, so that the nose mat passes through the through hole and then is fixed therein by rivets.

10. The assembled structure of a nose mat matched to a nose supporter as claimed in claim 1, further comprising a pair of fixing blocks embedded in the nose mat before the nose mat is shaped for respective coupling to the adjustable legs.

11. The assembled structure of a nose mat matched to a nose supporter as claimed in claim 1, wherein two sides of the nose mat are adhered to the two adjustable legs.

12. The assembled structure of a nose mat matched to a nose supporter as claimed in claim 1, wherein two adjustable legs are inserted into two sides of the nose mat.

13. The assembled structure of a nose mat matched to a nose supporter as claimed in claim 1, wherein the adjustable leg is made of metal.

* * * * *